Feb. 22, 1927.　　　　J. A. LONG　　　　1,618,541

METHOD OF AND APPARATUS FOR MANUFACTURING CHAMFERED PIPE AND NIPPLE BLANKS

Filed Jan. 2, 1926

Inventor

James A. Long.

By Emery, Booth, Janney & Varney his Attorneys

Patented Feb. 22, 1927.

1,618,541

UNITED STATES PATENT OFFICE.

JAMES A. LONG, OF READING, PENNSYLVANIA.

METHOD OF AND APPARATUS FOR MANUFACTURING CHAMFERED PIPE AND NIPPLE BLANKS.

Application filed January 2, 1926. Serial No. 78,898.

This invention relates to cutting pipe and tube stock into predetermined lengths and chamfering the ends preparatory to threading the ends externally, and is primarily intended for the manufacture of chamfered nipple blanks. The invention aims to improve generally both methods and apparatus for such purposes whereby better products may be produced more cheaply than heretofore.

In the manufacture of threaded nipples, much difficulty has heretofore been experienced in preventing the formation of burrs of metal upon both the inside and outside circumferential edges of the blank. Furthermore, in cutting the nipple blanks from pipe lengths in the manner heretofore known in the art, the cut edges of the nipple blank are left in a hardened or glazed condition. This condition, particularly if accompanied by burrs on the inner and outer edges, is highly unsuitable for the best results during the succeeding threading operation, as it rapidly dulls the dies and hence produces imperfect nipples. In many instances manufacturers have adopted the preliminary operation of chamfering the outer edges of the blanks better to prepare for the succeeding threading operations. Also the chamfered nipples have many advantages from the standpoint of the user over the blunt end nipples, as they are more readily assembled in the fitting together of pipe, and are less likely to cause lacerations.

In the accompanying drawings, wherein I have illustrated one form of mechanism by means of which the invention may be successfully practiced.

Figure 1:
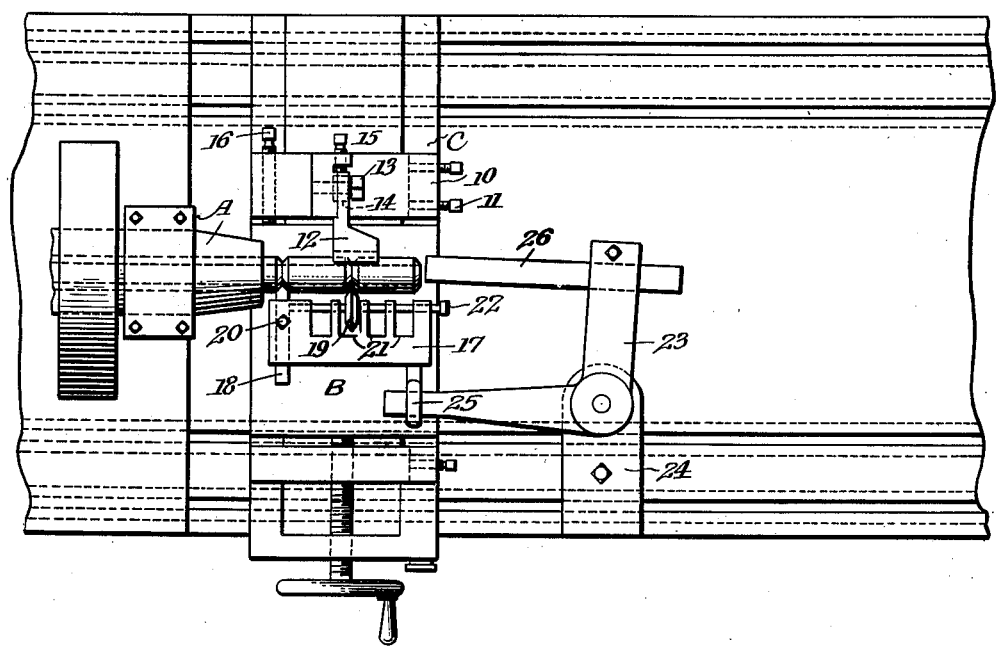
Figure 2:
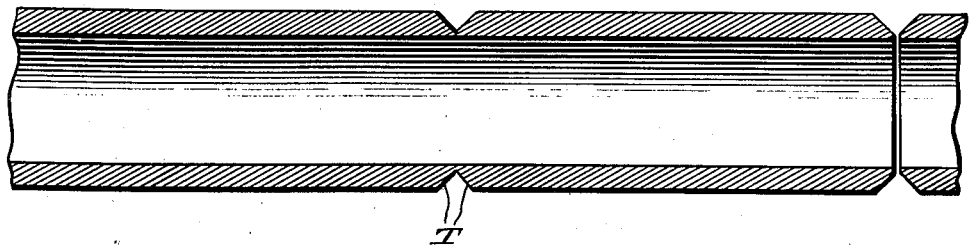

Fig. 1 is a plan view of a portion of a hollow spindle lathe or bar stock turning machine provided with mechanism adaptable to carry out the invention, and Fig. 2 is a detail sectional view of a portion of pipe illustrating the improved manner of making the chamfered nipple blanks.

In the embodiment of my invention illustrated in the drawings, I have shown the special equipment for practicing the invention as applied to a bar stock machine of a usual type. Such machines, are provided as part of their equipment with a rotary chuck A and a transverse slide B, sliding on the slideway C on the machine bed frame forward of and below the rotary chuck A.

According to my invention, as illustrated in Fig. 1, a bracket 10 is rigidly clamped to the slideway C by suitable means such as for instance set screws 11. The bracket 10 adjustably supports a back rest 12 as by means of a screw 13 passing through a slot 14 of the rest 12 to clamp the rest to the bracket. An adjustable stop 15 limits the movement of the rest rearwardly across the bracket 10. The bracket 10 may also be formed with a transverse threaded opening adjustably to receive an adjusting screw 16 or other means to limit the movements of the slide B toward the bracket 10.

The slide B rigidly supports, in any desirable manner, a tool holder 17, in which are mounted the chamfering tool 18 and rotary cutter 19. In the embodiment of this invention shown in the drawings the holder is apertured for the reception of the chamfering tool, and is provided with a suitable locking device, as for instance a set screw 20 for adjustably locking the chamfering tool in the holder. The holder may be formed with slots 21 for adjustably mounting the rotary cutter (shown as a cutting disc 19) at different distances from the chamfering tool 18, such ditsances to be determined according to the various lengths of nipples to be made. The slots 21 are made somewhat wider than the cutter 19 in order to permit the latter limited freedom of sidewise movement. The rotary cutter 19 may be rotatably mounted in any suitable manner as for instance by means of the spindle 22.

Suitable means are provided to limit the feeding of the work longitudinally through the chuck according to the length of nipple desired, and to release the nipple after it is completely cut off. In the illustrated embodiment of the invention a bell crank or other lever 23 is pivotally mounted on a bracket 24 adjustably secured to the bed of the machine. One end of the lever 23 has suitable operative connection with the slide B, as by means of an eye 25 carried by the slide and through which the end of the lever extends. The other end of the lever 23 is suitably formed to receive an adjustable back stop device, as for instance a bar 26. As is apparent from Fig. 1, when the slide B and tool holder are moved away from the work the lever 23 is moved to bring the forward end of the back stop into position to limit the movement of the work longitudinally through the chuck so that the rotary cutter will engage the work at the center of the groove made by the chamfering tool. When the slide and tool holder are moved toward the work for the cutting operation, the back stop is moved rearwardly thereby to permit the nipple blank to move sidewise and fall when completely cut off.

According to my invention, the pipe stock is held and rotated by suitable means, such as the chuck A, and is then subjected to the action of the chamfering tool 18 thereby to partially cut the stock and to form the tapered ends T on the blank as in (Fig. 2). I have found that it is desirable to so set the chamfering tool as to cut the pipe to within one thirty-second ($\frac{1}{32}$) of an inch of its inner wall. This is sufficient to form a deep chamfered or tapered end on the nipple, and at the same time leave a very thin wall to be cut by the rotary cutter which may be done without throwing up burrs on the cut edge. Furthermore, the $\frac{1}{32}$ inch blunt edge provides a smooth end finish, and does not leave any knife edges on the finished nipple which are dangerous to the hands of users.

Advantages of my invention are the simplicity of the apparatus and economy of the manufacturing process enabling the production of a chamfered nipple at a low cost. As compared with prior methods, a more perfect nipple blank may be produced on a single machine and by a single machining operation than has heretofore been known.

My invention obviously is not restricted to the details shown and described.

What I claim to be new is:

1. The method of cutting off lengths from pipe or tube stock in the forming of chamfered cylindrical blanks which consists in forming a chamfer groove in the side wall of the stock to partially sever the stock and then applying under pressure, a rolling cutting edge to the chamfer groove to complete the cutting off of the length.

2. The method of cutting pipe or tube stock into predetermined lengths for the formation of nipple blanks, which consists of chamfering the pipe at a desired point to provide a groove having oppositely tapered walls, and then applying to the center of the grooves a rolling cutting edge having limited capacity for sidewise movement to sever a predetermined length from said pipe without formation of a burr on the end thereof.

3. The method of cutting pipe or tube stock into predetermined lengths, to form nipple blanks having tapered ends, which consists in forming a V-shaped groove in said pipe, of a depth to within about $\frac{1}{32}$ inch of the thickness of said pipe, and then applying a rolling cutting edge under pressure to sever the length from the pipe.

4. In a machine for making chamfered nipple blanks, means for rotating a pipe length, means for grooving the pipe to partially cut the pipe and to chamfer one end of a nipple blank thereby delimited and the adjacent end of the pipe length, and cutting means for engagement with the groove in the partially cut pipe for completely severing the formed nipple blank from the pipe length, said cutting means having limited capacity for sidewise movement to accommodate itself to the cut.

5. In a machine for making chamfered nipple blanks, means for rotating a pipe length, a chamfering tool for grooving the pipe to partially cut the pipe and to chamfer one end of a nipple blank thereby delimited and the adjacent end of the pipe length, and a rolling disc cutter for engagement with the groove in the partially cut pipe for completely severing the formed nipple blank from the pipe length, said cutter being mounted to permit limited sidewise movement to prevent forming a burr on the end of the pipe.

6. In a machine for making chamfered nipple blanks from pipe lengths, in combination with a bar stock machine having a rotary chuck and a transverse tool slide, of tool equipment comprising a stationary chamfering tool for grooving the pipe to form a chamfered end on a nipple blank and to partially cut it off from the pipe, and a rolling disc cutter for completely cutting off the chamfered nipple blank.

7. In a machine for making chamfered nipple blanks from pipe lengths, in combination with a bar stock machine having a rotary chuck and a transverse tool slide, of tool equipment comprising a tool holder carried by the slide, a chamfering tool carried by the tool holder, a rolling disc cutter carried by the tool holder and adjustable to different distances from the chamfering tool according to the length of the nipple blank to be made.

8. In a machine for making chamfered nipple blanks from pipe lengths, in combination with a bar stock machine having a rotary chuck and a transverse tool slide, of tool equipment comprising a tool holder carried by the slide, a chamfering tool, a rolling disc cutter, means on said tool holder for rigidly and adjustably clamping the chamfering tool, said holder being formed with a series of openings, and means for rotatably supporting said rotary cutter in any one of said openings spaced from the chamfering tool according to the length of the nipple blank being cut.

9. In a machine for making chamfered nipple blanks from pipe lengths, in combination with a bar stock machine having a rotary chuck and a transverse tool slide, of tool equipment comprising a tool holder carried by said slide, a stationary chamfering tool and rolling disc cutter supported by said holder in spaced relation, means operatively connected to said slide for limiting the feeding of the pipe longitudinally through the chuck.

10. In a machine for making chamfered nipple blanks from pipe lengths, in combination with a bar stock machine having a rotary chuck and a transverse tool slide, of tool equipment comprising a tool holder carried by said slide, a stationary chamfering tool and rolling disc cutter supported by said holder in spaced relation, means operatively connected to said slide for limiting the feeding of the pipe longitudinally through the chuck during movement of said tools away from cutting engagement with said pipe, and for releasing said nipple blank during movement of said tools into cutting engagement with said pipe.

In testimony whereof, I have signed my name to this specification.

JAMES A. LONG.